United States Patent
Nagpal et al.

(10) Patent No.: US 11,030,469 B2
(45) Date of Patent: Jun. 8, 2021

(54) SYSTEM AND METHOD FOR DETECTION OF FREE PARKING SPACE FOR A VEHICLE

(71) Applicant: KPIT Technologies Limited, Pune (IN)

(72) Inventors: Tanu Nagpal, Pune (IN); Chethan S.P., Pune (IN); Anusha B., Pune (IN); Manoj Dwivedi, Pune (IN); Sudipta Bhattacharjee, Pune (IN); Manish Shiralkar, Pune (IN)

(73) Assignee: KPIT TECHNOLOGIES LIMITED, Pune (IN)

( * ) Notice: Subject to any disclaimer, the term of this patent is extended or adjusted under 35 U.S.C. 154(b) by 362 days.

(21) Appl. No.: 16/252,665

(22) Filed: Jan. 20, 2019

(65) Prior Publication Data

US 2019/0370572 A1   Dec. 5, 2019

(30) Foreign Application Priority Data

May 31, 2018   (IN) .............................. 201821020510

(51) Int. Cl.
   *G06K 9/00* (2006.01)
   *G06T 7/62* (2017.01)
   *G06K 9/46* (2006.01)

(52) U.S. Cl.
   CPC ....... *G06K 9/00812* (2013.01); *G06K 9/4604* (2013.01); *G06T 7/62* (2017.01); *G06T 2207/10016* (2013.01); *G06T 2207/20061* (2013.01); *G06T 2207/30264* (2013.01)

(58) Field of Classification Search
   None
   See application file for complete search history.

(56) References Cited

U.S. PATENT DOCUMENTS

| | | | |
|---|---|---|---|
| 10,685,241 B2* | 6/2020 | Kang | ......................... G06T 7/70 |
| 2009/0207045 A1* | 8/2009 | Jung | ................... G06K 9/00798 |
| | | | 340/932.2 |
| 2018/0129887 A1* | 5/2018 | Kang | ................. G06K 9/00798 |
| 2019/0095722 A1* | 3/2019 | Kang | ...................... G06T 7/215 |

OTHER PUBLICATIONS

Suhr, J.K.—"A Universal Vacant Parking Slot Recognition System Using Sensors Mounted on Off-the-Shelf Vehicles"—Sensors—Apr. 13, 2018—pp. 1-21 (Year: 2018).*

* cited by examiner

*Primary Examiner* — Bernard Krasnic
(74) *Attorney, Agent, or Firm* — Foley & Lardner LLP

(57) ABSTRACT

A detection system implemented in a vehicle to detect free parking space is disclosed. The system comprises an input unit for imaging perspective view around the vehicle and a processing unit to receive a sequence of images from the at least one image sensor and detect at least one polygon pertaining to a parking slot in at least one image of the sequence of images, transform the at least one image into a bird's-eye-view image using a homography matrix, detect at least one quadrilateral pertaining to a parking slot, transform the bird's-eye-view image comprising the at least one quadrilateral, into corresponding image pertaining to perspective view around the vehicle using an inverse homography matrix, to analyse real world co-ordinates of the parking slot, and determine type of the parking slot by computing real world dimensions based on analysis of the real world co-ordinates of the parking slot.

12 Claims, 19 Drawing Sheets

——— Actual Line
- - - - Detected Line

| Parking Angle | Space Width | Space Length | Aisle Width (1-way) | Aisle Width (2-way) | Width at Curb |
|---|---|---|---|---|---|
| 90° | 9' | 18'0" | 24'0" | 24'0" | 9'0" |
| 60° | 9' | 21'0" | 18'0" | 20'0" | 10'5" |
| 45° | 9' | 19'10" | 15'0" | 20'0" | 12'9" |
| 30° | 9' | 16'10" | 12'0" | 20'0" | 18'0" |
| Parallel | 8' | 24'0" | 12'0" | 24'0" | n/a |

SYSTEM AND METHOD FOR DETECTION OF FREE PARKING SPACE FOR A VEHICLE

CROSS-REFERENCE TO RELATED APPLICATIONS

This application claims the benefit of and priority to Indian Patent Application no. 201821020510, filed May 31, 2018, and titled "System and Method for Detection of Free Parking Space for A Vehicle," which is incorporated by reference in its entirety.

TECHNICAL FIELD

The present disclosure relates to the field of image processing. More particularly, the present disclosure relates to a system and method for detection of free parking space for a vehicle.

BACKGROUND

A parking space is a cleared area that is intended for parking vehicles such as cars. The space may be delineated by road surface markings to create plurality of parking slots such that a vehicle may fit inside a parking slot. Finding an available parking slot during busy time or in congested area is a tedious task as more time and energy of a driver may be drained while looking for the available parking slot. Thus, recognition of a free parking slot is important to avoid unnecessary time conception by driver of the vehicle.

Various methods and techniques have been developed to overcome the problem of detecting free parking slots. An automatic parking system provides convenience for drivers by automatically identifying available parking slots, thereby saving time and energy. Recently, there has been increased interest in automatic parking systems. Free parking space detection in an automatic parking system has been developed using various methods, for example, ultrasonic sensor-based method, laser scanner-based method, short range radar network-based method, and vision-based method. Among these, the vision-based method is attractive to drivers as it visualizes parking procedures, which provide ease to the drivers.

However, there have been various limitations in the existing solutions. In existing solutions detections may be hampered due to irregular light conditions for example, when there is too much glare or shadow due to sun or when there is no sufficient light in indoor parking space. Further, detections may also be hampered as it is possible that dimensions of the parking slot are not perfect due to some obstacle or interference. Sometimes, cracks on the parking slot result in skewed detection of the rectangular slot. Also, detection will not be possible, if the outdoor parking has grass on it. Many existing solutions highly depend on quality of images used for detections as the predicted status of the parking slot may be affected due to noise present in the images.

There is therefore need in the art to develop a system and method for detection of free parking slot for a vehicle that overcome the above-mentioned and other limitations of the existing solutions and utilize techniques, which are robust, accurate, fast, efficient and simple.

SUMMARY

The present disclosure relates to the field of image processing. More particularly, the present disclosure relates to a system and method for detection of free parking space for a vehicle.

According to an aspect of the present disclosure, a detection system implemented in a vehicle comprises: an input unit comprising at least one image sensor for imaging perspective view around the vehicle; and a processing unit comprising a processor coupled with a memory, the memory storing instructions executable by the processor to: receive a sequence of images from the at least one image sensor and detect at least one polygon pertaining to a parking slot, by performing a contour approximation technique based on detection of one or more edges, in at least one image of the sequence of images; transform the at least one image into a bird's-eye-view image using a homography matrix; detect at least one quadrilateral pertaining to a parking slot based on extraction of plurality of Hough lines from the bird's-eye-view image and determination of one or more points of intersection between the plurality of Hough lines; transform the bird's-eye-view image comprising the at least one quadrilateral, into corresponding image pertaining to perspective view around the vehicle using an inverse homography matrix, to analyse real world co-ordinates of the parking slot; and determine type of the parking slot by computing real world dimensions based on analysis of the real world co-ordinates of the parking slot.

In an embodiment, the processor further analyses status of the parking slot based on spatial information of the detected at least one quadrilateral in the bird's-eye view image.

In an embodiment, type of the parking slot is any of a parallel parking slot, a perpendicular parking slot or an angular parking slot.

In an embodiment, the processor filters out the detected parking slots having inaccurate dimensions by comparing the computed real world dimensions with actual real world dimensions of the parking slot.

In an embodiment, on extraction of the plurality of Hough lines, the processor further categorize each of one or more Hough lines selected from the plurality of Hough lines into a vertical line and a horizontal line based on slope value each of the one or more Hough lines.

In an embodiment, the processor further extracts one or more dominant vertical lines based on a first median slope value computed using slope values of the one or more Hough lines categorized as vertical lines and one or more dominant horizontal lines based on a second median slope value computed using slope values of the one or more Hough lines categorized as horizontal lines.

In an embodiment, the processor validates the extracted plurality of Hough lines by: transforming the bird's-eye-view image comprising the plurality of Hough lines into corresponding image pertaining to perspective view around the vehicle using an inverse homography matrix; determining a confidence value of each Hough line of the plurality of Hough lines, wherein the confidence value is high if position of said Hough line is in proximity of corresponding edge selected from the detected one or more edges in the at least one image; and removing at least one Hough line of the plurality of Hough lines, the at least one Hough line having the confidence value lower than a first pre-determined threshold.

In an embodiment, in order to determine the one or more points of intersection, the processor computes a start point and an end point of each of the plurality of Hough lines and extends each of the plurality of Hough lines beyond the corresponding start point and the corresponding end point.

In an embodiment, on detection of the at least one quadrilateral, the processor performs any or a combination of a first filtering technique and a second filtering technique on the detected at least one quadrilateral, wherein the first filtering technique is based on determination of a confidence value of each of the detected at least one quadrilateral and the second filtering technique is based on determination of at least overlapping quadrilaterals such that in case an overlap value is above a second pre-determined threshold, a quadrilateral having larger area among the at least two overlapping quadrilaterals is removed.

In an embodiment, the processor performs a smoothing technique by comparing corners of the at least one quadrilateral detected in at least any two consecutive images of the sequence of images.

In an embodiment, said system is enabled to perform said detection when the vehicle is surrounded by a plurality of neighbouring vehicles in close proximity.

In an embodiment, the processing unit is operatively coupled with an output unit to provide any or a combination of the status and the type of the parking slot to driver of the vehicle.

According to another aspect of the present disclosure, a method, carried out according to instructions stored in a computer implemented in a vehicle, comprises: receiving a sequence of images from the at least one image sensor and detecting at least one polygon pertaining to a parking slot, by performing a contour approximation technique based on detection of one or more edges, in at least one image of the sequence of images, wherein each image of the sequence of images pertains to perspective view around the vehicle; transforming the at least one image into a bird's-eye-view image using a homography matrix; detecting at least one quadrilateral pertaining to a parking slot based on extraction of plurality of Hough lines from the bird's-eye-view image and determination of one or more points of intersection between the plurality of Hough lines; transforming the bird's-eye-view image comprising the at least one quadrilateral, into corresponding image pertaining to perspective view around the vehicle using an inverse homography matrix, to analyse real world co-ordinates of the parking slot; and determining type of the parking slot by computing real world dimensions based on analysis of the real world co-ordinates of the parking slot.

It is an object of the present disclosure to provide a system and method for detection of free parking space for a vehicle.

Another object of the present disclosure is to provide a system and method for detection of free parking space for a vehicle that detects the free parking space even if the lines pertaining to the parking slot are faded in obtained images due to light conditions.

Another object of the present disclosure is to provide a system and method for detection of free parking space that provides type and status of the parking slot to driver of the vehicle.

Yet another object of the present disclosure is to provide a system and method for detection of free parking space that enables detection in cluttered environment when the vehicle is surrounded by other neighbouring vehicles.

Various objects, features, aspects and advantages of the present disclosure will become more apparent from the following detailed description of preferred embodiments, along with the accompanying drawing figures in which like numerals represent like features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein.

DETAILED DESCRIPTION

Figure 1:
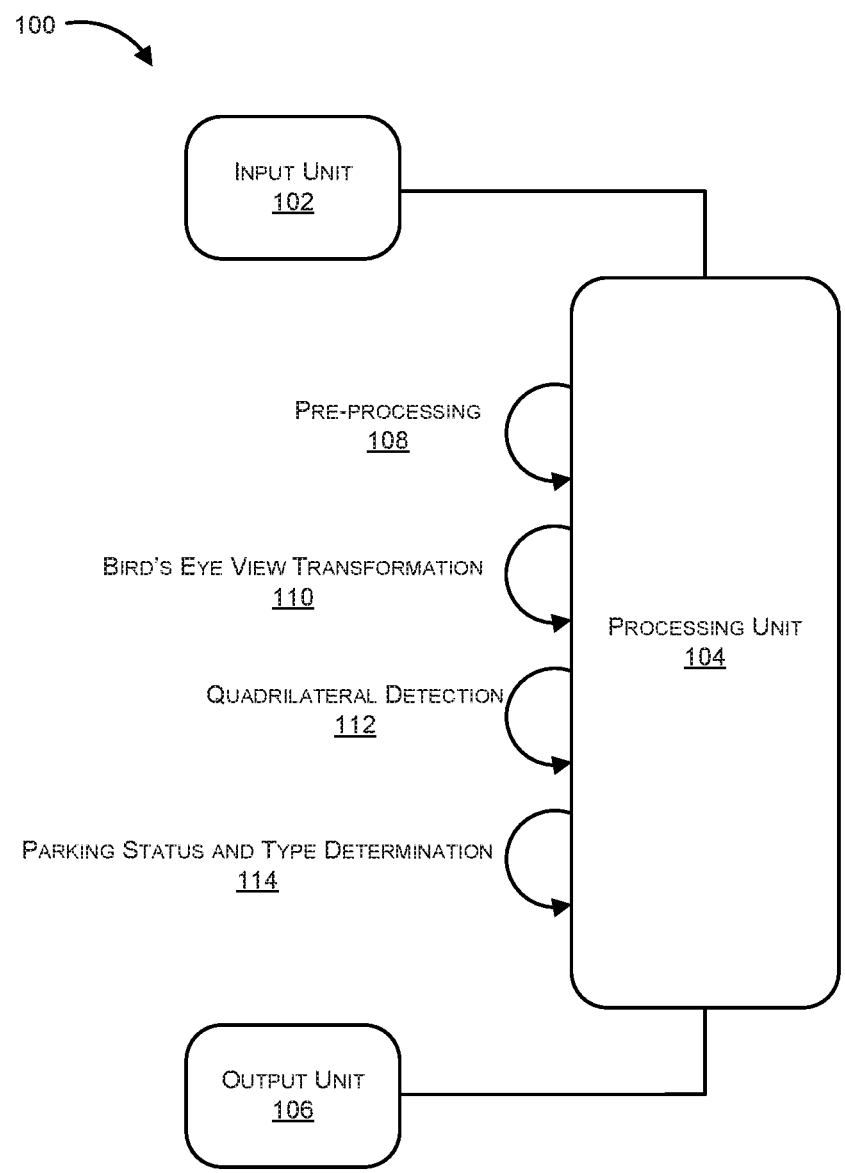
FIG. 1 illustrates architecture of a detection system to illustrate its overall working in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the disclosure to those of ordinary skill in the art. The disclosure disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the disclosure. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present disclosure is to be accorded the widest scope encompassing numerous alternatives, modifications and equivalents consistent with the principles and features disclosed. For purpose of clarity, details relating to technical material that is known in the technical fields related to the disclosure have not been described in detail so as not to unnecessarily obscure the present disclosure.

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named element.

Embodiments of the present disclosure may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate aspect of the disclosure, which for infringement purposes is recognized as including equivalents to the various elements or limitations specified in the claims. Depending on the context, all references below to the "disclosure" may in some cases refer to certain specific embodiments only. In other cases it will be recognized that references to the "disclosure" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Various terms as used herein are shown below. To the extent a term used in a claim is not defined below, it should be given the broadest definition persons in the pertinent art have given that term as reflected in printed publications and issued patents at the time of filing.

The present disclosure relates to the field of image processing. More particularly, the present disclosure relates to a system and method for detection of free parking space for a vehicle.

According to an aspect of the present disclosure a detection system implemented in a vehicle comprises: an input unit comprising at least one image sensor for imaging perspective view around the vehicle; and a processing unit comprising a processor coupled with a memory, the memory storing instructions executable by the processor to: receive a sequence of images from the at least one image sensor and detect at least one polygon pertaining to a parking slot, by performing a contour approximation technique based on detection of one or more edges, in at least one image of the sequence of images; transform the at least one image into a bird's-eye-view image using a homography matrix; detect at least one quadrilateral pertaining to a parking slot based on extraction of plurality of Hough lines from the bird's-eye-view image and determination of one or more points of intersection between the plurality of Hough lines; transform the bird's-eye-view image comprising the at least one quadrilateral, into corresponding image pertaining to perspective view around the vehicle using an inverse homography matrix, to analyse real world co-ordinates of the parking slot; and determine type of the parking slot by computing real world dimensions based on analysis of the real world co-ordinates of the parking slot.

In an embodiment, the processor further analyses status of the parking slot based on spatial information of the detected at least one quadrilateral in the bird's-eye view image.

In an embodiment, type of the parking slot is any of a parallel parking slot, a perpendicular parking slot or an angular parking slot.

In an embodiment, the processor filters out the detected parking slots having inaccurate dimensions by comparing the computed real world dimensions with actual real world dimensions of the parking slot.

In an embodiment, on extraction of the plurality of Hough lines, the processor further categorize each of one or more Hough lines selected from the plurality of Hough lines into a vertical line and a horizontal line based on slope value each of the one or more Hough lines.

In an embodiment, the processor further extracts one or more dominant vertical lines based on a first median slope value computed using slope values of the one or more Hough lines categorized as vertical lines and one or more dominant horizontal lines based on a second median slope value computed using slope values of the one or more Hough lines categorized as horizontal lines.

In an embodiment, the processor validates the extracted plurality of Hough lines by: transforming the bird's-eye-view image comprising the plurality of Hough lines into corresponding image pertaining to perspective view around the vehicle using an inverse homography matrix; determining a confidence value of each Hough line of the plurality of Hough lines, wherein the confidence value is high if position of said Hough line is in proximity of corresponding edge selected from the detected one or more edges in the at least one image; and removing at least one Hough line of the plurality of Hough lines, the at least one Hough line having the confidence value lower than a first pre-determined threshold.

In an embodiment, in order to determine the one or more points of intersection, the processor computes a start point and an end point of each of the plurality of Hough lines and extends each of the plurality of Hough lines beyond the corresponding start point and the corresponding end point.

In an embodiment, on detection of the at least one quadrilateral, the processor performs any or a combination of a first filtering technique and a second filtering technique on the detected at least one quadrilateral, wherein the first filtering technique is based on determination of a confidence value of each of the detected at least one quadrilateral and the second filtering technique is based on determination of at least overlapping quadrilaterals such that in case an overlap value is above a second pre-determined threshold, a quadrilateral having larger area among the at least two overlapping quadrilaterals is removed.

In an embodiment, the processor performs a smoothing technique by comparing corners of the at least one quadrilateral detected in at least any two consecutive images of the sequence of images.

In an embodiment, said system is enabled to perform said detection when the vehicle is surrounded by a plurality of neighbouring vehicles in close proximity.

In an embodiment, the processing unit is operatively coupled with an output unit to provide any or a combination of the status and the type of the parking slot to driver of the vehicle.

According to another aspect of the present disclosure, a method, carried out according to instructions stored in a computer implemented in a vehicle, comprises: receiving a sequence of images from the at least one image sensor and detecting at least one polygon pertaining to a parking slot, by performing a contour approximation technique based on detection of one or more edges, in at least one image of the sequence of images, wherein each image of the sequence of images pertains to perspective view around the vehicle; transforming the at least one image into a bird's-eye-view image using a homography matrix; detecting at least one quadrilateral pertaining to a parking slot based on extraction of plurality of Hough lines from the bird's-eye-view image and determination of one or more points of intersection between the plurality of Hough lines; transforming the bird's-eye-view image comprising the at least one quadrilateral, into corresponding image pertaining to perspective view around the vehicle using an inverse homography matrix, to analyse real world co-ordinates of the parking slot; and determining type of the parking slot by computing real world dimensions based on analysis of the real world co-ordinates of the parking slot.

FIG. 1 illustrates architecture of a detection system to illustrate its overall working in accordance with an embodiment of the present disclosure.

According to an embodiment, a detection system 100 is implemented in a vehicle comprises an input unit 102, a processing unit 104 and an output unit 106. The input unit 102 may comprise one or more image sensors or cameras configured in a vehicle to capture images of different perspective views around the vehicle. In an implementation, the image sensors or the cameras may be placed on external mirror position of the vehicle. The processing units 104 may comprise a processor and a memory and/or may be integrated with existing systems and controls of a vehicle to form an advanced driver assistance system (ADAS), or augment an existing ADAS. For instance, signals generated by the processing unit 104 may be sent to engine control unit (ECU) of the vehicle and may aid in parking of the vehicle. The output unit 106 may be a display device or any other audio-visual device that provides any or a combination of the status and the type of the parking slot to driver of the vehicle in the form of audio or video signals or a combination of the two.

According to an embodiment, the processing unit 104 at step of pre-processing 108 receives a sequence of images from the at least one image sensor and detects at least one polygon pertaining to a parking slot, by performing a contour approximation technique based on detection of one or more edges, in at least one image of a sequence of images. Further, the processing unit 104 at step of bird's-eye view transformation 110, transforms the at least one image into a bird's-eye-view image using a homography matrix. At step 112, the processing unit 104 detects at least one quadrilateral pertaining to a parking slot based on extraction of plurality of Hough lines from the bird's-eye-view image and determination of one or more points of intersection between the plurality of Hough lines. Moreover, at step 114, the processing unit 104 transforms the bird's-eye-view image comprising the at least one quadrilateral, into corresponding image pertaining to perspective view around the vehicle using an inverse homography matrix, to analyse real world co-ordinates of the parking slot and determines type of the parking slot that may be any of a parallel parking slot, a perpendicular parking slot or an angular parking slot by computing real world dimensions based on analysis of the real world co-ordinates of the parking slot.

In an embodiment, the processing unit 104 at step 114, further analyses status of the parking slot based on spatial information of the detected at least one quadrilateral in the bird's-eye view image.

In an embodiment, the processing unit 104 filters out the detected parking slots having inaccurate dimensions by comparing the computed real world dimensions with actual real world dimensions of the parking slot.

In an embodiment, on extraction of the plurality of Hough lines, the processing unit 104 further categorize each of one or more Hough lines selected from the plurality of Hough lines into a vertical line and a horizontal line based on slope value each of the one or more Hough lines to extract dominant vertical lines and dominant horizontal lines. In an embodiment, one or more dominant vertical lines are extracted based on a first median slope value computed using slope values of the one or more Hough lines categorized as vertical lines and one or more dominant horizontal lines are extracted based on a second median slope value computed using slope values of the one or more Hough lines categorized as horizontal lines.

In an embodiment, the processing unit 104 validates the extracted plurality of Hough lines by: transforming the bird's-eye-view image comprising the plurality of Hough lines into corresponding image pertaining to perspective view around the vehicle using an inverse homography matrix; determining a confidence value of each Hough line of the plurality of Hough lines, wherein the confidence value is high if position of said Hough line is in proximity of corresponding edge selected from the detected one or more edges in the at least one image; and removing at least one Hough line of the plurality of Hough lines, the at least one Hough line having the confidence value lower than a first pre-determined threshold.

In an embodiment, in order to determine the one or more points of intersection, the processing unit 104 computes a start point and an end point of each of the plurality of Hough lines and extends each of the plurality of Hough lines beyond the corresponding start point and the corresponding end point.

In an embodiment, on detection of the at least one quadrilateral, the processing unit 104 performs any or a combination of a first filtering technique and a second filtering technique on the detected at least one quadrilateral that is based on determination of a confidence value of each of the detected at least one quadrilateral and the second filtering technique that is based on determination of at least overlapping quadrilaterals such that in case an overlap value is above a second pre-determined threshold, a quadrilateral having larger area among the at least two overlapping quadrilaterals is removed.

In an embodiment, the processing unit 104 performs a smoothing technique by comparing corners of the at least one quadrilateral detected in at least any two consecutive images of the sequence of images.

One skilled in the art would appreciate the system 100 is enabled to perform detection of the parking slot even when the vehicle is surrounded by a plurality of neighbouring vehicles in close proximity.

Figure 2:
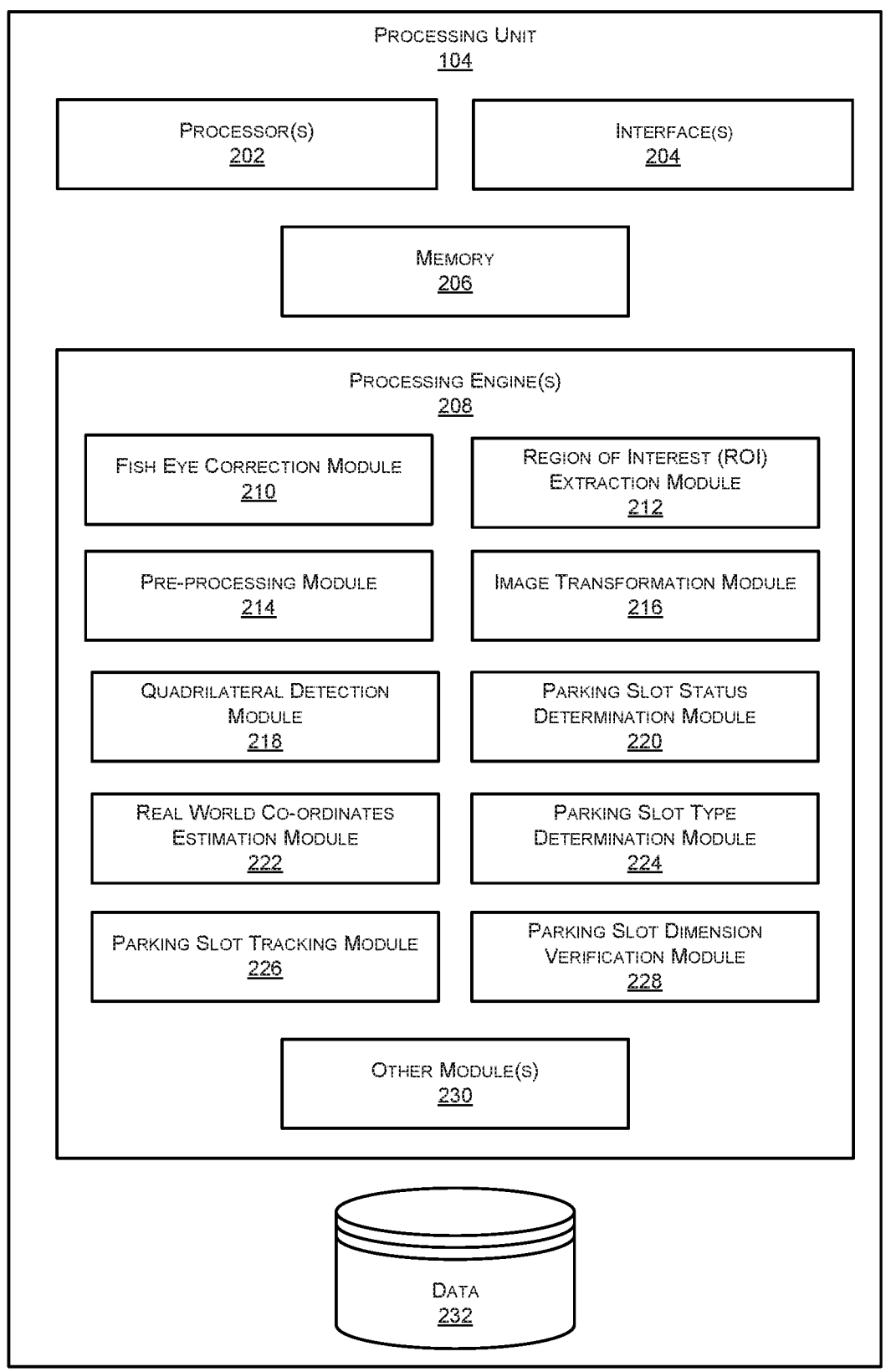
FIG. 2 illustrates exemplary modules of a processing unit in accordance with an embodiment of the present disclosure.

FIG. 2 illustrates exemplary modules of a processing unit in accordance with an embodiment of the present disclosure.

In an aspect, the processing unit 104 may comprise one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 206 of the processing unit 104. The memory 206 may store one or more computer-readable instructions or routines, which may be fetched and executed to create or share the data units over a network service. The memory 206 may comprise any non-transitory storage device including, for example, volatile memory such as RAM, or non-volatile memory such as EPROM, flash memory, and the like.

The processing unit 104 may also comprise an interface(s) 204. The interface(s) 204 may comprise a variety of interfaces, for example, interfaces for data input and output devices, referred to as I/O devices, storage devices, and the like. The interface(s) 204 may facilitate communication of processing unit 104 with various devices coupled to the processing unit 104 such as the input unit 102 and the output unit 106. The interface(s) 204 may also provide a communication pathway for one or more components of the processing unit 104. Examples of such components include, but are not limited to, processing engine(s) 208 and data 232.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the processing unit 104 may comprise the machine-readable storage medium storing the instructions and the processing resource to execute the instructions, or the machine-readable storage medium may be separate but accessible to processing unit 104 and the processing resource. In other examples, the processing engine(s) 208 may be implemented by electronic circuitry.

The data 232 may comprise data that is either stored or generated as a result of functionalities implemented by any of the components of the processing engine(s) 208.

In an exemplary embodiment, the processing engine(s) 208 may comprise a fish eye correction module 210, a region of interest (ROI) extraction module 212, a pre-processing module 214, an image transformation module 216, a quadrilateral detection module 218, a parking slot status determination module 220, a real world co-ordinates estimation module 222, a parking slot type determination module 224, a parking slot tracking module 226, a parking slot dimension verification module 228 and other module(s) 230.

It would be appreciated that modules being described are only exemplary modules and any other module or sub-module may be included as part of the system 100 or the processing unit 104. These modules too may be merged or divided into super-modules or sub-modules as may be configured.

Fish Eye Correction Module 210

According to an embodiment, the processing unit 104 receives a sequence of images pertaining perspective view around the vehicle from any image capturing device such as an image sensor or a camera that may form part of the input unit 102. As known in the art, cameras with fisheye lenses cause radial distortion to the image. Therefore, a fish eye correction module 210 is utilized to determine intrinsic parameters of the camera for which camera calibration may be performed using a chessboard pattern. To perform correction, a rectilinear model which contains no distortion and fisheye projection model which contains distortion is required. An exemplary pin-hole camera/rectilinear and fish eye projection model principle is described with reference to FIGS. 3A and 3B respectively.

Figure 3A:
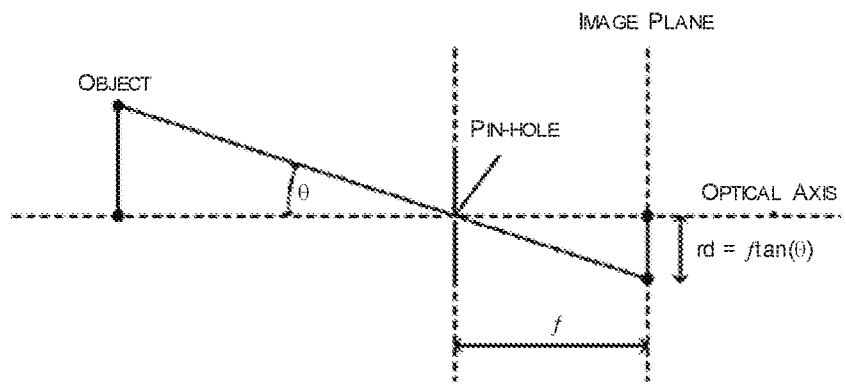
FIGS. 3A-B represents exemplary rectilinear projection and fish eye projection according to an embodiment of the present disclosure.

Referring to FIG. 3A, a rectilinear projection may be described by the mapping function:

$$r_u = f \tan \theta \qquad (1)$$

where, $r_u$ is undistorted distance of projected point from centre, $\theta$ is angle that the projected point makes with optical axis at the centre of projection and f is focal length. The centre of distortion may be assumed to be the centre of the image.

Figure 3B:
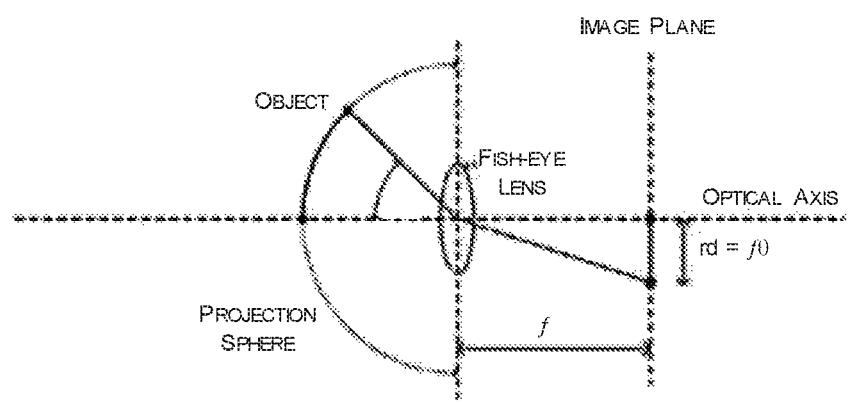

Further, referring to FIG. 3B the fish-eye lens may be assumed to follow the equidistance projection formula that is given by:

$$r_d = f\theta \qquad (2)$$

where, $r_d$ is the distorted height of the projected point on the image plane.

According to an embodiment, manipulating equations (1) and (2) may provide a conversion from equidistant image to rectilinear image. The conversions may be given by:

$$r_u = f \tan(r_d/f) \qquad (3)$$

$$r_d = f \arc \tan(r_u/f) \qquad (4)$$

The undistorted pixel map may be created using equations (3) and (4) in Cartesian coordinates. The undistorted pixel map may be mapped to the source/distorted pixel map by a simple bilinear interpolation to get a smooth output.

Region of Interest (ROI) Extraction Module 212

According to an embodiment, the ROI extraction module 212 extracts an ROI from the image. In an example, ROI may be determined by considering a real world distance criteria of say 10 m, which may be the maximum distance set for detection. Further, following steps may be utilized to determine the ROI.

1. Finding centre of the fish eye corrected image
2. Converting the centre from pixel to world coordinate
3. Finding a difference=Maximum distance−Centre World coordinate
4. Finding a new starting distance=difference+Centre World coordinate
5. Converting the new starting distance from world to image coordinate Pre-Processing Module 214

According to an embodiment, the pre-processing module 214 receives a sequence of images from the image sensor and considers an image of the sequence of image to detect at least one polygon pertaining to a parking slot, by performing a contour approximation technique based on detection of one or more edges in the image.

According to an embodiment, the pre-processing module 214 preforms techniques of image smoothing, edge detection and contour approximation to detect a polygon pertaining to a parking slot. The pre-processing module 214 performs image smoothing to eliminate noises and preserve valuable information in an image. In an implementation, the pre-processing module 214 utilizes Gaussian smoothing algorithm to remove speckle noises by preserving edges of the parking slots in the image. As known in the art, applying a Gaussian blur to the image is similar to convolving the image with a Gaussian function.

As it would be appreciated by the one skilled in the art, detection of edges, which are formed on boundary between various region in an image, is required for estimating structure of an object in an image. According to an embodiment, the pre-processing module 214 performs edge detection to detect parking slot lines/edges in an image. In an implementation, the pre-processing module 214 utilizes Canny edge detection algorithm for edge detection. In canny edge detection algorithm, the intensity gradient of the image is calculated after smoothing the image. Further, non-maximum suppression is carried out to get rid of spurious response to edge detection. Subsequently, potential edges are calculated by applying double threshold and finally edge detection is accomplished by suppressing edges that are weak and are not connected to strong edges.

According to an embodiment, the pre-processing module 214 performs contour approximation by utilizing Douglas-Peucker algorithm. As it would be appreciated, contour approximation is performed to approximate a contour to another shape with less number of vertices. In present application, contour approximation is performed to find a polygon using the detected edge pixels. The pre-processing module 214 generates a four sided polygon pertaining to the parking slot based on the detected edges.

Image Transformation Module 216

A person skilled in the art would appreciate that, in order to effectively extract parking lines pertaining to the parking slot, a top view (bird's-eye-view) transformation is required of the perspective view scene captured by the imaging sensor. As generally every line of the polygon pertaining to the parking slot are perpendicular to each other, the image transformation module 216 calculates a homography matrix ($H_{3\times3}$) in order to define a relationship between perspective and top view in terms of scaling, skewness and translation.

Figure 4A:
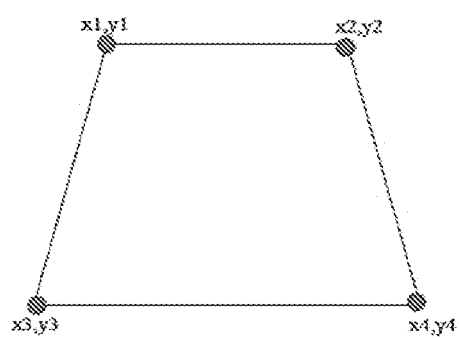
FIGS. 4A-B illustrates transformation of perspective view image into bird's-eye-view image according to an embodiment of the present disclosure.
Figure 4B:
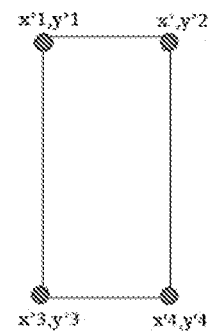

FIGS. 4A-B illustrate transformation of perspective view image into bird's-eye-view image according to an embodiment of the present disclosure.

According to an embodiment, the image transformation module 216 determines a homography matrix by selecting the four correspondent points P, P' between perspective view image and reference top view image as illustrated in FIGS. 4A and 4B respectively. For example, P={(x1, y1), (x2, y2), (x3, y3), (x4, y4)}; and
P={(x' 1, y' 1), (x' 2, y' 2), (x' 3, y' 3), (x' 4, y' 4)}

In an embodiment, the Homography $H_{3\times3}$ matrix may be calculated between P and P' using Direct Linear Transformation (DLT) technique as defined by:

$$\underbrace{\begin{bmatrix} -x1 & -y1 & -1 & 0 & 0 & 0 & x1x1' & y1x1' & x1' \\ 0 & 0 & 0 & -x1 & -y1 & -1 & x1y1' & y1y1' & y1' \\ -x2 & -y2 & -1 & 0 & 0 & 0 & x2x2' & y2x2' & x2' \\ 0 & 0 & 0 & -x2' & -y2 & -1 & x2y2' & y2y2' & y2' \\ -x3 & -y3 & -1 & 0 & 0 & 0 & x3x3' & y3x3' & x3' \\ 0 & 0 & 0 & -x3 & -y3 & -1 & x3y3' & y3y3' & y3' \\ -x4 & -y4 & -1 & 0 & 0 & 0 & x4x4' & y4x4' & x4' \\ 0 & 0 & 0 & -x4 & -y4 & -1 & x4y4' & y4y4' & y4' \end{bmatrix}}_{8X9} \underbrace{\begin{bmatrix} h1 \\ h2 \\ h3 \\ h4 \\ h5 \\ h6 \\ h7 \\ h8 \\ h9 \end{bmatrix}}_{9X1} = \underbrace{\begin{bmatrix} 0 \\ 0 \\ 0 \\ 0 \\ 0 \\ 0 \\ 0 \\ 0 \end{bmatrix}}_{8X1} \quad (5)$$

$$H_{3\times3} = \begin{bmatrix} h1 & h2 & h3 \\ h4 & h5 & h6 \\ h7 & h8 & h9 \end{bmatrix} \quad (6)$$

Thus, if the perspective view image is considered as I, the image transformation module 216, transforms I into a Bird's eye view image ($I^{Bird}$) using following relation:

$$I^{Bird} = H_{3\times3} * I \quad (7)$$

Quadrilateral Detection Module 218

In an embodiment, in order to detect quadrilateral pertaining to the parking slot, the quadrilateral detection module extracts plurality of Hough lines from the bird's-eye-view image. To extract the Hough lines, the quadrilateral detection module incorporates a probabilistic based Hough technique. An exemplary technique for extraction of plurality of Hough lines utilized by various embodiments of the present disclosure is further elaborated with respect to FIGS. 5A-D

In an embodiment, the quadrilateral detection module 218 performs an ortho-parallel process to extract the lines that are contributing in formation of a quadrilateral pertaining to the parking slot. Initially, the quadrilateral detection module 218 categorizes each of one or more Hough lines selected from the plurality of Hough lines into a vertical line and a horizontal line based on slope value each of the one or more Hough lines. Further, the quadrilateral detection module 218 extracts one or more dominant vertical lines based on a first median slope value computed using slope values of the one or more Hough lines categorized as vertical lines and one or more dominant horizontal lines based on a second median slope value computed using slope values of the one or more Hough lines categorized as horizontal lines. The output of the ortho-parallel process is the Hough lines, which are contributing in quadrilateral formation. An exemplary technique to perform ortho parallel process utilized by various embodiments of the present disclosure is further elaborated with respect to FIGS. 6A-D.

According to an embodiment, the quadrilateral detection module 218 validates the extracted plurality of Hough lines based on line alignment and confidence of line. Said validation plays an important role in eliminating the lines, which are not aligned along the parking slot and thereby reduces computational time. In an embodiment, the validation is performed by transforming the bird's-eye-view image comprising the plurality of Hough lines into corresponding image pertaining to perspective view around the vehicle using an inverse homography matrix and determining a confidence value of each Hough line of the plurality of Hough lines, wherein the confidence value is high if position of said Hough line is in proximity of corresponding edge selected from the detected one or more edges in the at least one image. Further, Hough line having the confidence value lower than a first pre-determined threshold is removed. An exemplary technique for validation of the extracted Hough lines in further explained with reference to FIGS. 7A-B.

According to an embodiment, in order to detect the quadrilateral pertaining to the parking slot, the quadrilateral detection module 218 determines of one or more points of intersection between the plurality of Hough lines. To determine the one or more points of intersection, the quadrilateral detection module 218 computes a start point and an end point of each of the plurality of Hough lines and extends each of the plurality of Hough lines beyond the corresponding start point and the corresponding end point. An exemplary technique for determining the one or more points of intersection is further explained with reference to FIG. 8.

According to an embodiment, the quadrilateral detection module 218 detects the quadrilateral pertaining to the parking slot based on the extracted plurality of Hough lines and the determined one or more points of intersection between the plurality of Hough lines. Thus the intersection points and their corresponding lines are utilized to find the quadrilateral pertaining to the parking slot. Further, in an event when more than one quadrilateral is detected pertaining to a same parking slot, most optimal rectangle may be determined using quadrilateral with highest confidence level determined using the validation technique. An exemplary technique for determining the quadrilateral is elaborated with respect to FIGS. 9A-E.

According to an embodiment, the quadrilateral detection module 218 performs a smoothing technique by comparing corners of the detected quadrilateral in at least any two consecutive images of the sequence of images. Said embodiment focuses on stabilizing the quadrilateral detection. A person skilled in the art would appreciate that due to vehicle movement and other environmental factors, coordinate points of the quadrilateral pertaining to same parking slot may get slightly shifted across the images of the sequence of images and may provide wobbling effect at final output. The present disclosure minimizes such an effect by applying low pass filter logic to corners of the detected quadrilateral. Said utilization of low pass filter to perform a quadrilateral filtering technique is further elaborated with reference to FIG. 10

Parking Slot Status Determination Module 220

According to an embodiment, status of the parking slot may be classified as free or occupied. The parking slot status determination module 220 analyses status of the parking slot based on spatial information of the detected at least one quadrilateral in the bird's-eye view image.

Figure 11:
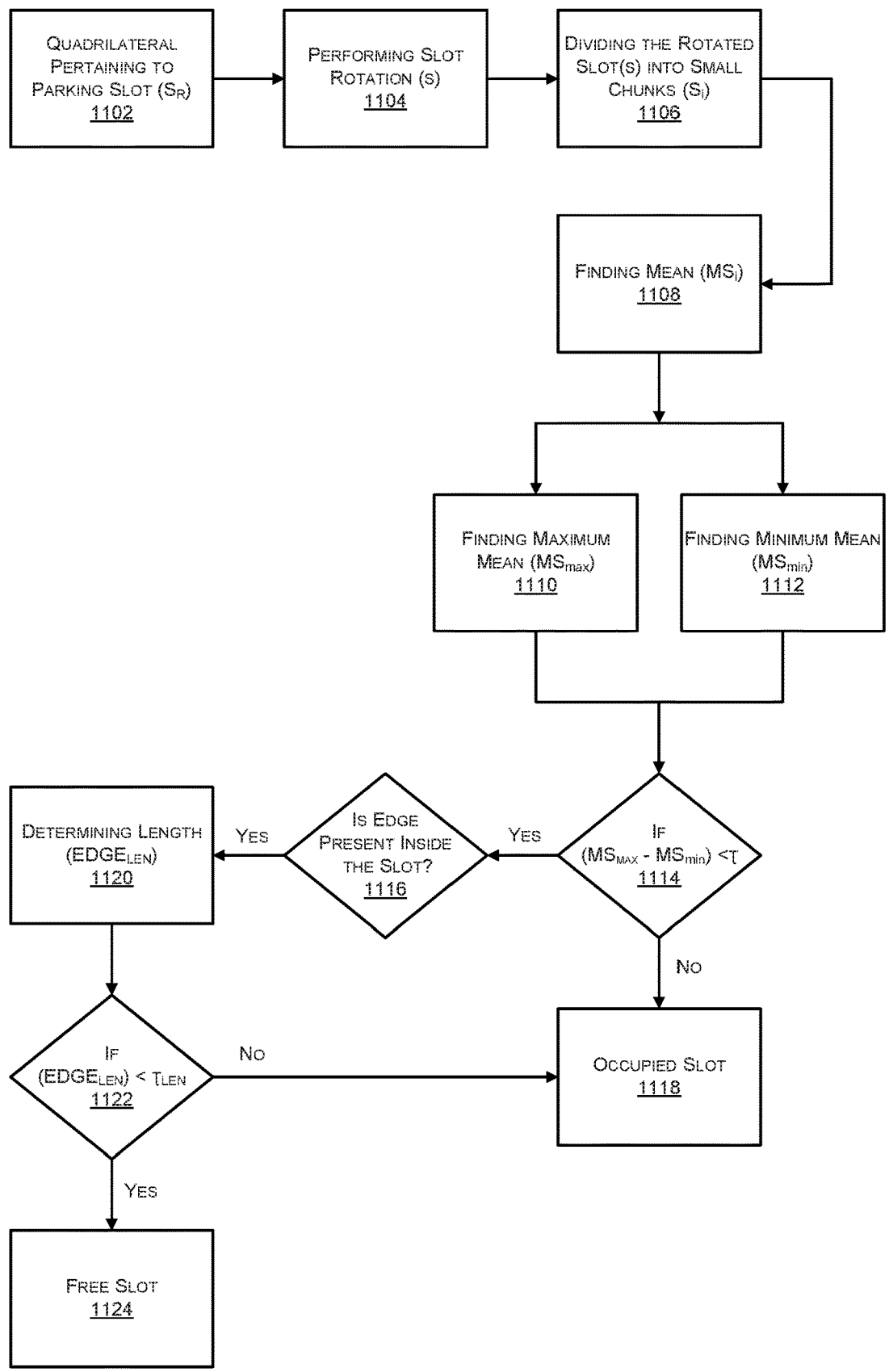
FIG. 11 illustrates exemplary working of parking slot status determination module according to an embodiment of the present disclosure.

FIG. 11 illustrates exemplary working of parking slot status determination module 220 according to an embodiment of the present disclosure. According to an embodiment, status of the parking slot i.e. free or occupied may be analysed based on spatial information of the detected quadrilateral, pertaining to the parking slot, in bird's eye view image. As illustrated in FIG. 11, at block 1102, detected quadrilateral pertaining to the parking slot is considered. Further, at block 1104, the quadrilateral is rotated by an angle 'θ' such that the slot confines are in-line with boundaries of the image. The angle 'θ' may be determined by an equation:

$$\theta = \cos(d/\text{ceil}(\sqrt{l})) \qquad (7)$$

Where,
d—Dot product of vectors
l—Product of the squared lengths

The vectors are given by mid-points of the image and the detected quadrilateral pertaining to the parking slot respectively. Further, at block 1106 the rotated quadrilateral is divided equally into small chunks, for example 8 small regions. At block 1108, mean is calculated for each chunk and at block 1110 and 1112 minimum mean and maximum mean is considered. Difference between maximum and minimum mean of the quadrilateral is considered as a resultant value. At block 1114, if the resultant value is greater than a threshold, then the parking slot associated with the detected quadrilateral is marked as occupied at block 1118. However, if at block 1114, the resultant is less than a threshold, at block 1116, edge is considered, and it is detected whether the edge lies inside the parking slot. At block 1120, if the edge lies inside the parking slot length of edge is determined. At block 1122, if the edge of length is less than a threshold, the parking slot associated with the detected quadrilateral is marked as free at block 1124; otherwise the parking slot associated with the detected quadrilateral is marked as occupied at block 1118.

According to an embodiment, the quadrilateral is detected in bird's eye view image; the quadrilateral is mapped back into the image pertaining to perspective view around the vehicle using the image transformation module 216. Said transformation may be performed by the inverse mapping of the homography matrix ($H^{-1}_{3\times 3}$).

$$I = H^{-1}_{3\times 3} * P^{Bird} \qquad (8)$$

For example, a point x,y in the bird's-eye-view image may be mapped to point $X^{-1}, Y^{-1}$ in the perspective view image using following equation:

$$X^{-1} = \frac{x \times H^{-1}[0][0] + y \times H^{-1}[0][1] + H^{-1}[0][2]}{x \times H^{-1}[2][0] + y \times H^{-1}[2][1] + H^{-1}[2][2]} \qquad (9)$$

-continued
$$Y^{-1} = \frac{x \times H^{-1}[1][0] + H^{-1}[1][1] + H^{-1}[1][2]}{x \times H^{-1}[2][0] + H^{-1}[2][1] + H^{-1}[2][2]} \qquad (10)$$

Real World Co-Ordinates Estimation Module 222

According to an embodiment, the real world co-ordinates estimation module 222 analyses real world co-ordinates of the parking slot based on the transformation of the bird's-eye-view image comprising the at least one quadrilateral into corresponding image pertaining to perspective view around the vehicle.

Figure 12A:
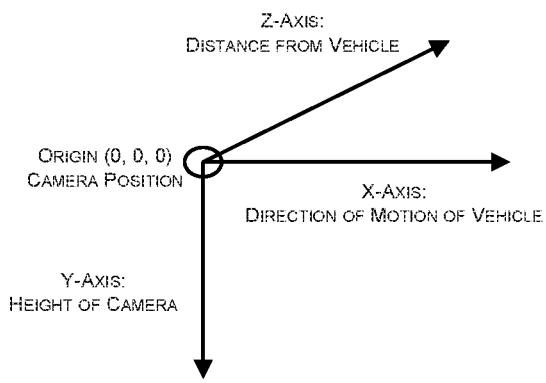
FIGS. 12A-C illustrates estimation of real world co-ordinates of the parking slot according to an embodiment of the present disclosure.
Figure 12B:
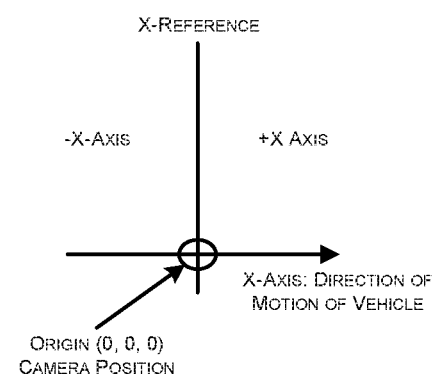
Figure 12C:
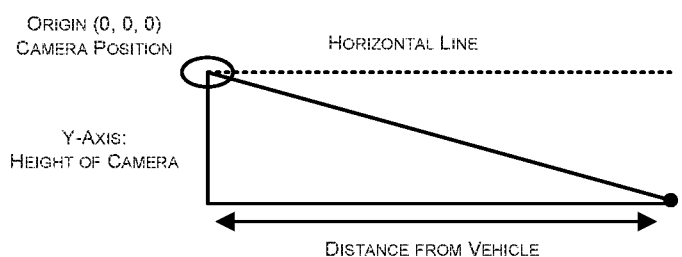

FIGS. 12A-C illustrate estimation of real world co-ordinates of the parking slot according to an embodiment of the present disclosure.

In an embodiment, the real world co-ordinates estimation module 222 calculates coordinates (X, Y, Z) of a point in real world coordinate system. The point is initially determined in image coordinate system (x, y) and is mapped to the corresponding point in real world. The Cartesian coordinate system used is as illustrated in FIG. 12A. The focal length (f) used is updated after fish eye correction as the image is captured from a pin hole camera of focal length (f).

In order to calculate the coordinate in real world, following three processes are utilized:
1. Calculating X in real world
2. Calculating Y in real world
3. Calculating Z in real world For calculating X in real world, distance in X direction of real world system is considered as positive in direction of motion of the vehicle and negative in the opposite direction.

According to an embodiment, using distance calculated in Z direction and intrinsic parameters of camera, the real distance in meters covered in one pixel of the image is determined. Also, a reference line lateral to X direction is required to mark between the positive and negative values, as illustrated in FIG. 12B. With the per-pixel distance and the difference between the x-value of the point with the X-reference line, the real world distance in X direction is determined.

According to an embodiment, as illustrated in FIG. 12A, for calculating Y in real world, as the camera is considered as the origin (0, 0, 0) of the real world system, the height of the camera is negative distance in Y-direction.

According to an embodiment, for calculating Z in real world, position information, focal length and extrinsic parameters of the camera is utilized, the distance in Z direction in meters is determined from the bottom line of the vehicle. The pictorial representation of calculating Z distance is illustrated in FIG. 12C.

Parking Slot Type Determination Module 224

As known in the art, most common type of parking slots are of three types, namely parallel, perpendicular and angular. The dimensions of these types are based on the predefined standards for vehicles. These dimensions are provided in FIG. 13A and FIG. 13B.

According to an embodiment, the parking slot type determination module 224 determines real world length and width of the parking slot using the real world coordinates of the four corners of the parking slot. Based on the dimensions of the parking slot, the parking slot type determination module 224 classifies the parking slot as a parallel, perpendicular or angular.

Parking Slot Tracking Module 226

The parking slot tracking module 226 keeps a track of output of few previous images of the sequence of images. Considering that the parking slot information cannot change abruptly while a vehicle is maneuvering parking area, the previous output information could be used to validate the output of current image.

Figure 14:
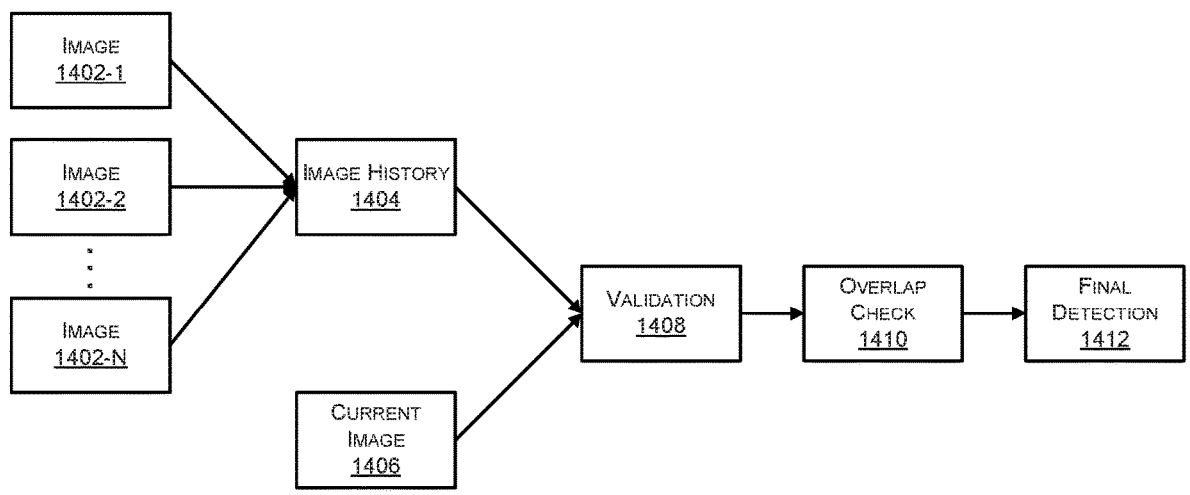
FIG. 14 illustrates exemplary working of parking slot tracking module according to an embodiment of the present disclosure.

FIG. 14 illustrates exemplary working of parking slot tracking module 226 according to an embodiment of the present disclosure.

According to an embodiment, output information of previous images 1402-1, 1402-2 . . . 1402-N is stored as image history 1404 and a track id is associated with each detection in an image. Detection in current image 1406 is compared with image history 1404 and is analysed in validation block 1408. The track id is updated for next detections in consecutive images. In case any new detection appears which do not match with existing track ids, a new id is assigned to it. Also if a track id does not repeat for next few images, the track id is removed. In case of intermittent miss detection in current image 1406 for a track that had consistent detection in previous images, the parking slot tracking module 226 may ensure continued detection for next few images. In current frame 1406, if any of the properties of a parking slot are not consistent with the properties stored in the previous images, they are corrected using the information stored in image history 1404. At block 1410, overlapping detection and predictions are filtered out to obtain only one output over a parking slot at block 1412.

Parking Slot Dimension Verification Module 228

The parking slot dimension verification module 228 is used to filter out the parking slots that are detected but are of inaccurate dimensions. Such detections may occur due to a false line from cracks, obstacles or shadows near the slot and could be removed easily by comparing the length and width of the detection in real world with the actual real world dimensions of the slot.

Figures 13A, 13B:
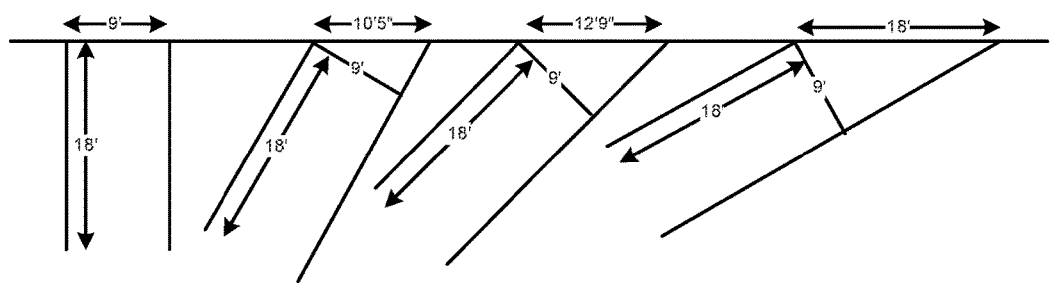
FIGS. 13A-B illustrates dimensions of various types of parking slots according to an embodiment of the present disclosure.

According to an embodiment, the parking slot dimension verification module 228 utilizes real world corners of the detected parking slot to calculate the length and width of the parking slot. Depending upon the type of the slot, dimensions may vary. For example, in case of a parallel slot length is greater than width and width is greater than length for a perpendicular slot. Also, from the standard dimensions of parking slot as illustrated in FIG. 13A and FIG. 13B the length and width dimensions may be compared with some tolerance. Further, the parking slot type determined by the parking slot type determination module 224 is used for dimension comparison. If the detected parking slot does not fall within the specified range of real world length and width, parking slot dimension verification module 228 may filtered out said parking slot. Thus, parking slot dimension verification module 228 performs parking slot dimension verification in real world coordinates, thereby enhancing for accuracy of the system 100.

According to an embodiment, the processing unit 104 provides an output to the output unit 106. The output may comprise type and status of the parking slot that assists the driver to decide whether to park in the detected parking slot or not.

FIG. 5A-D illustrate extraction of plurality of Hough lines from the bird's-eye-view image according to an embodiment of the present disclosure.

Initially, the quadrilateral detection module 218 converts every set of points P (X,Y) (in bird's-eye-view image) in a Hough space (ρ, θ) using following relation:

$$\rho = X \cos\theta + Y \sin\theta$$

Thus, a set of two or more points that form a straight line will resultant into sinusoidal curve which intersects at the (ρ, θ) for said line.

Figure 5A:
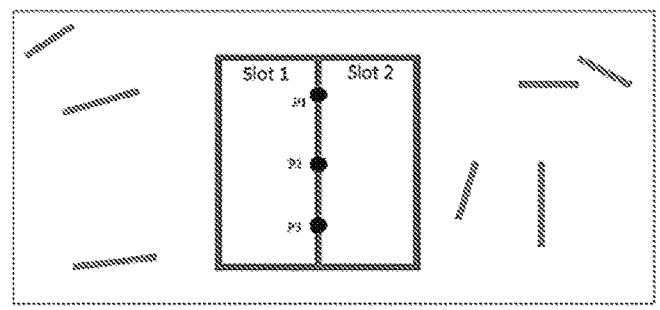
FIGS. 5A-D illustrates extraction of plurality of Hough lines from the bird's-eye-view image according to an embodiment of the present disclosure.

FIG. 5A represents exemplary bird's-eye-view image of a parking space. In an example, as illustrated the points P1, P2 and P3 are considered and converted in the Hough space.

Figure 5B:
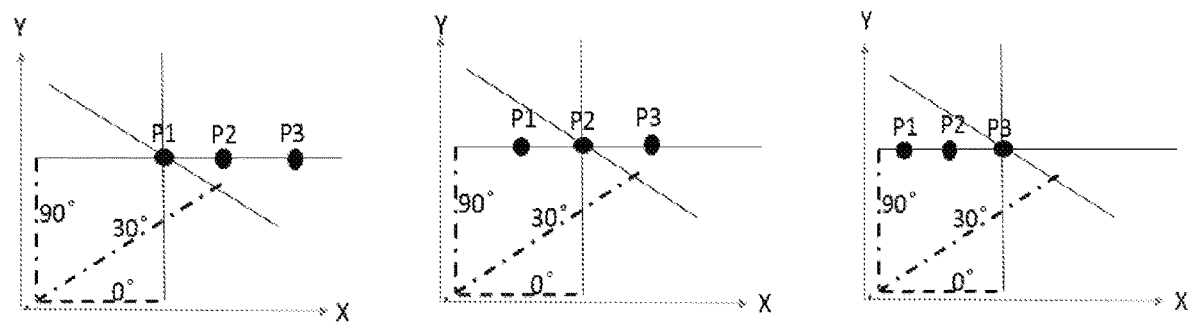

FIG. 5B represents exemplary representation of points in bird's-eye-view image in Cartesian space.

As illustrated, from each point (P1, P2 and P3), number of lines are passing in various directions (illustrated by solid lines). Therefore, for each line, a line perpendicular line is considered, which intersects at the origin (illustrated as dashed lines).

Further, length (i.e. perpendicular distance from the origin) and angle of each dashed lines for each data point (P1, P2 and P3) is obtained.

In an example, length (ρ) and angle (θ) values corresponding to P1 is provided in table 1, length (ρ) and angle (θ) values corresponding to P2 is provided in table 2 and length (ρ) and angle (θ) values corresponding to P3 is provided in table 3.

TABLE 1

| ANGLE (θ) | DISTANCE (ρ) |
|---|---|
| 0 | 40 |
| 30 | 60 |
| 90 | 81 |

TABLE 2

| ANGLE (θ) | DISTANCE (ρ) |
|---|---|
| 0 | 57 |
| 30 | 62 |
| 90 | 80 |

TABLE 3

| ANGLE (θ) | DISTANCE (ρ) |
|---|---|
| 0 | 70 |
| 30 | 59 |
| 90 | 79 |

Figure 5C:
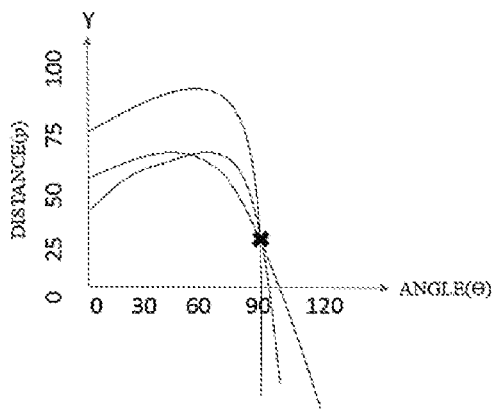
Figure 5D:
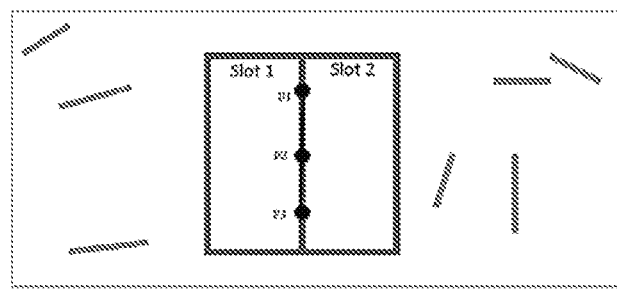

In an embodiment, the quadrilateral detection module 218 may then represent the values of length and angle for each data point (P1, P2 and P3) in a graph as illustrated in FIG. 5C, to determine distance and angle that indicates a point where the curves intersect. Said distance and angle indicate the line, which intersects the points that were considered (P1, P2 and P3). For the determined angle, Hough line is illustrated as black line passing through P1, P2 and P3 as illustrated in FIG. 5D.

FIGS. 6A-D illustrate an exemplary ortho-parallel process according to an embodiment of the present disclosure.

Figure 6A:
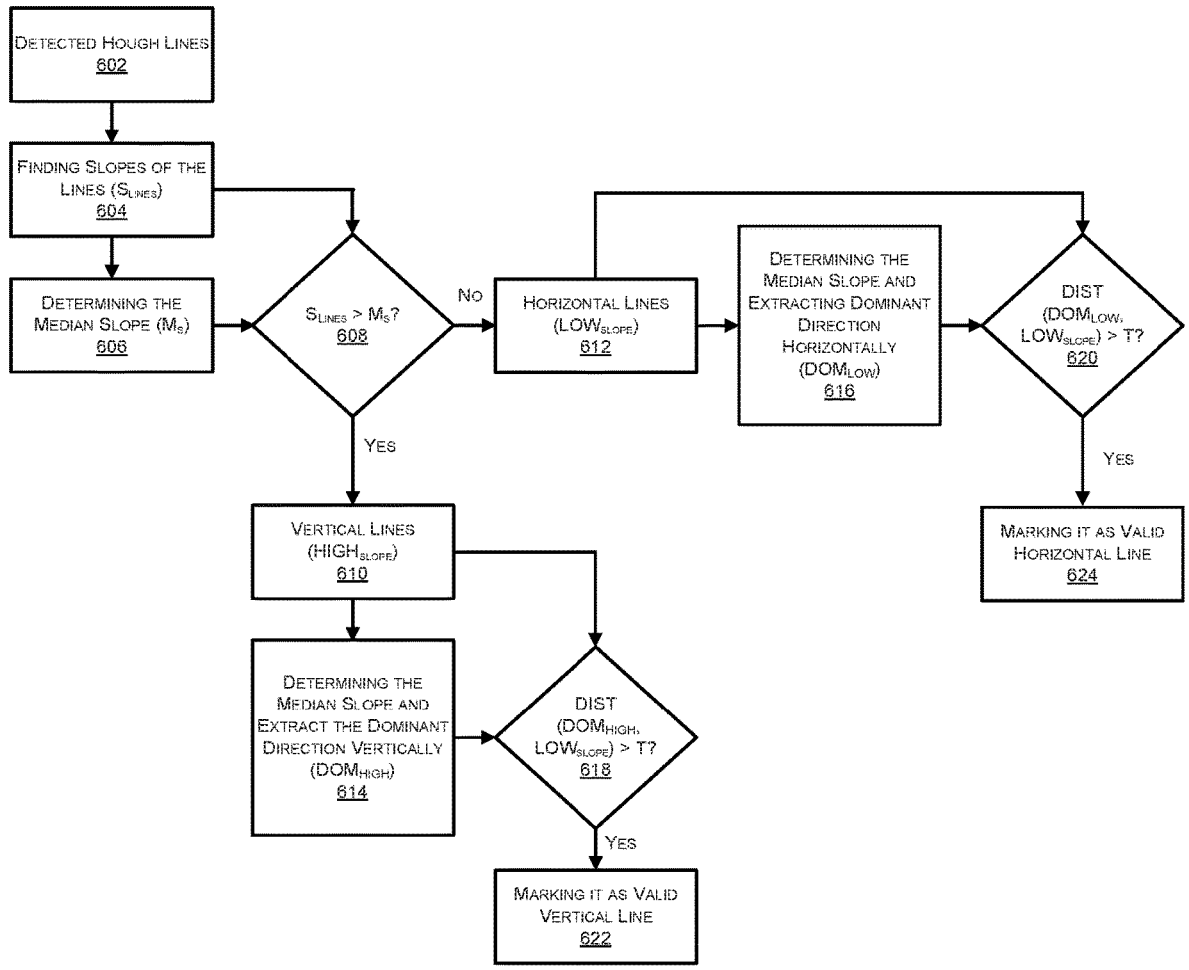
FIGS. 6A-D illustrates an exemplary ortho-parallel process according to an embodiment of the present disclosure.

FIG. 6A illustrates overall flow of ortho-parallel process to extract Hough lines that are contributing to formation of a quadrilateral according to an embodiment of the present disclosure.

Figure 6B:
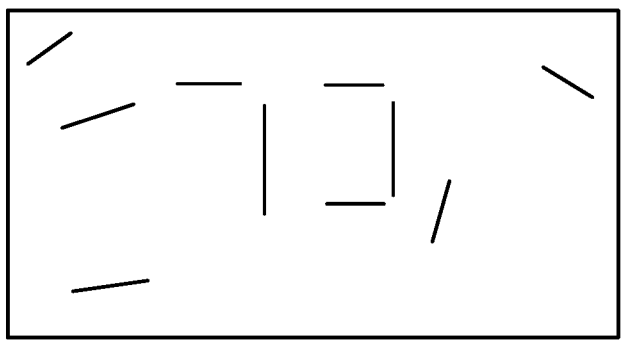

At block 602, the detected Hough lines as illustrated in FIG. 6B are considered as input to perform ortho-parallel process. At block 604, slopes of each of the Hough line is computed (Sums). In an embodiment, at block 606, median slope value (Ms) is calculated such that at block 608, Sums is compared with Ms to categorize each of the Hough line into Vertical ($HIGH_{slope}$) at block 610 and Horizontal lines (LOWslope) at block 612 based on the median slope value.

Figure 6C:
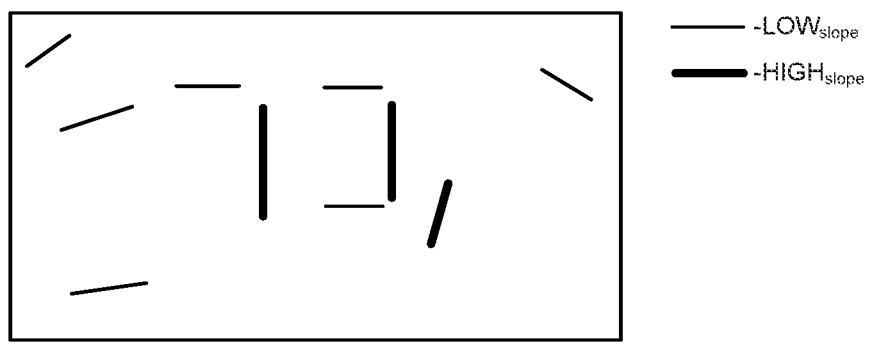

Said characterization of each of the Hough lines into vertical lines and horizontal lines is illustrated in FIG. 6C.

Figure 6D:
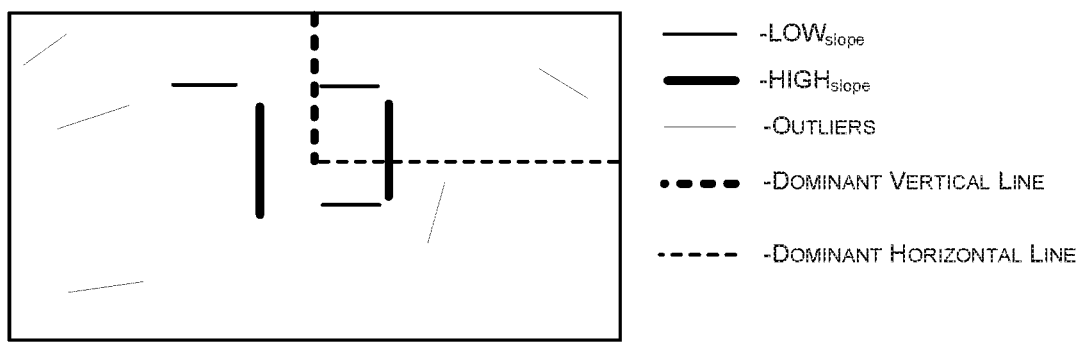

According to an embodiment, once the Hough lines are categorized into vertical lines and horizontal lines, a further process for eliminating outliers is performed. At block 614, a first median slope value ($DOM_{HIGH}$) is computed using slope values of the Hough lines categorized as vertical lines and at block 616, a second median slope value ($DOM_{LOW}$) is computed using slope values of the Hough lines categorized as horizontal lines. Thus, dominant line directions ($DOM_{HIGH}$ and $DOM_{LOW}$) are extracted using the median slope values. In a preferred embodiment, the quadrilateral is a rectangle; therefore, an assumption is considered that the dominant directions are always perpendicular to each other. Therefore, at block 618 and 620 the lines from vertical lines group and horizontal lines group along the respective dominant lines are selected using distance metric such that valid lines contributing in rectangle formation are extracted and marked as valid lines at block 622 and 624 by excluding the outliers/noisy lines. FIG. 6D illustrates elimination of the outliers by retaining valid lines based on the first median value and the second median value.

Figure 7A:
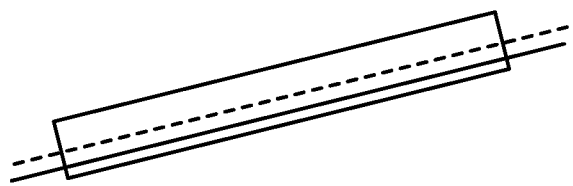
FIGS. 7A-B illustrates validation of extracted Hough lines according to an embodiment of the present disclosure.
Figure 7B:
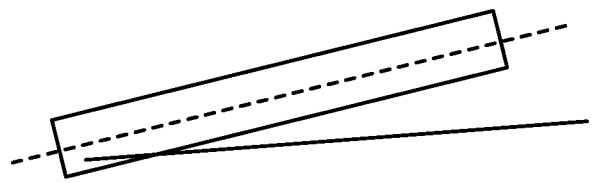

FIGS. 7A-B illustrate validation of extracted Hough lines according to an embodiment of the present disclosure.

According to an embodiment, the extracted Hough lines are validated based on line alignment and confidence of line. An exemplary technique utilized for said validation is divided into three processes namely an inverse transformation process, a line confidence determination process and a line filtration process.

During inverse transformation process, as the lines are in bird's eye view image, transformation into perspective view image is performed. Said transformation to an image pertaining to perspective view around the vehicle may be performed using Inverse of homography matrix. Thus, the lines in the bird's-eye-view image may be easily mapped to edges in perspective view image for further processes.

During line confidence determination process, the confidence is calculated by taking start and end points (x and y coordinates) of each line. Further, based on slope, every line is characterized as horizontal line or vertical line to select respective different window sizes as illustrated in FIGS. 7A and 7B. FIG. 7A illustrates selection of window size for line with high confidence and FIG. 7B illustrates selection of window size for line with low confidence.

For each line characterized as a horizontal line or a vertical line, intermediate points between start and end points are calculated along the line. These intermediate points are passed to calculate the confidence of each point. In an event when, the intermediate point is lying along the edge in the perspective view image or has max intensity value when compared to the side pixels within the window, the point may be considered as the confident point. The sum of confidence value of all the points divided by the count of intermediate points maybe computed as the confidence value of a particular line. In an embodiment, the detection of line is marked with high confidence if line lies close to the edges in the perspective view image. Thus, closer the line to the edges, higher is the confidence.

During line filtration process, line filtering is performed based on overall confidence of every line detected in the image. The high confidence lines are processed and low confidence lines are removed.

Figure 8:
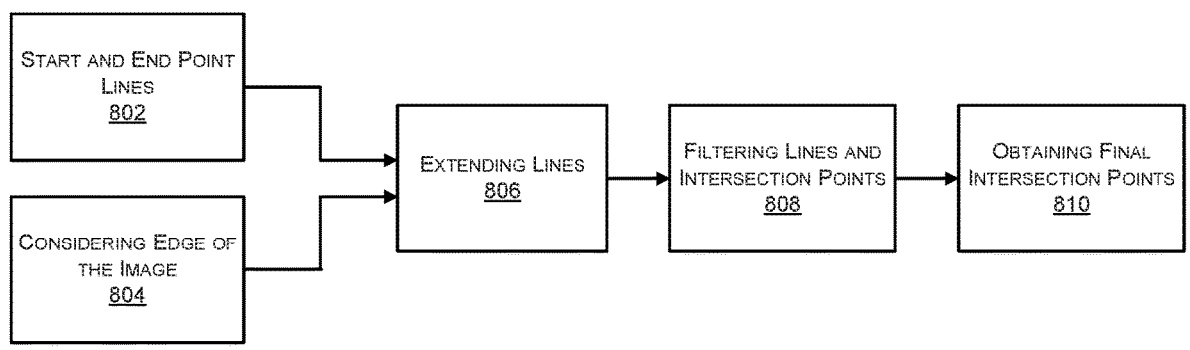
FIG. 8 illustrates a block diagram for determination of one or more points of intersection according to an embodiment of the present disclosure.

FIG. 8 illustrates a block diagram for determination of one or more points of intersection according to an embodiment of the present disclosure.

According to an embodiment, one or more intersection points are determined in the bird's-eye-view image by computing start and end point of the extracted Hough lines at block 802. Further, at block 804 edges of the perspective view image are considered to sort the Hough lines based on their distance from the edges in the perspective view image. At block 806, all the lines with high confidence detected by the validation technique are extended beyond the corresponding start point and the corresponding end point to cover full image and the lines with low confidence are ignored. A person skilled in the art would appreciate that such extension of lines enables detection even the lines in the image are faded due to light conditions.

Further, the extended lines intersect each other multiple times within the image as they are not exactly parallel to each other. There may be multiple intersection points where ideally one intersection point is expected, thus, at block 808, these intersection points lying in the image region are refined based on distance from each other. The points close to each other are merged to one intersection point and the repeated lines with common intersection points are cleared. At block 810, final intersection points are obtained after filtering the intersection points and the lines.

FIGS. 9 A-E illustrate determination of a quadrilateral pertaining to a parking slot according to an embodiment of the present disclosure.

Figure 9A:
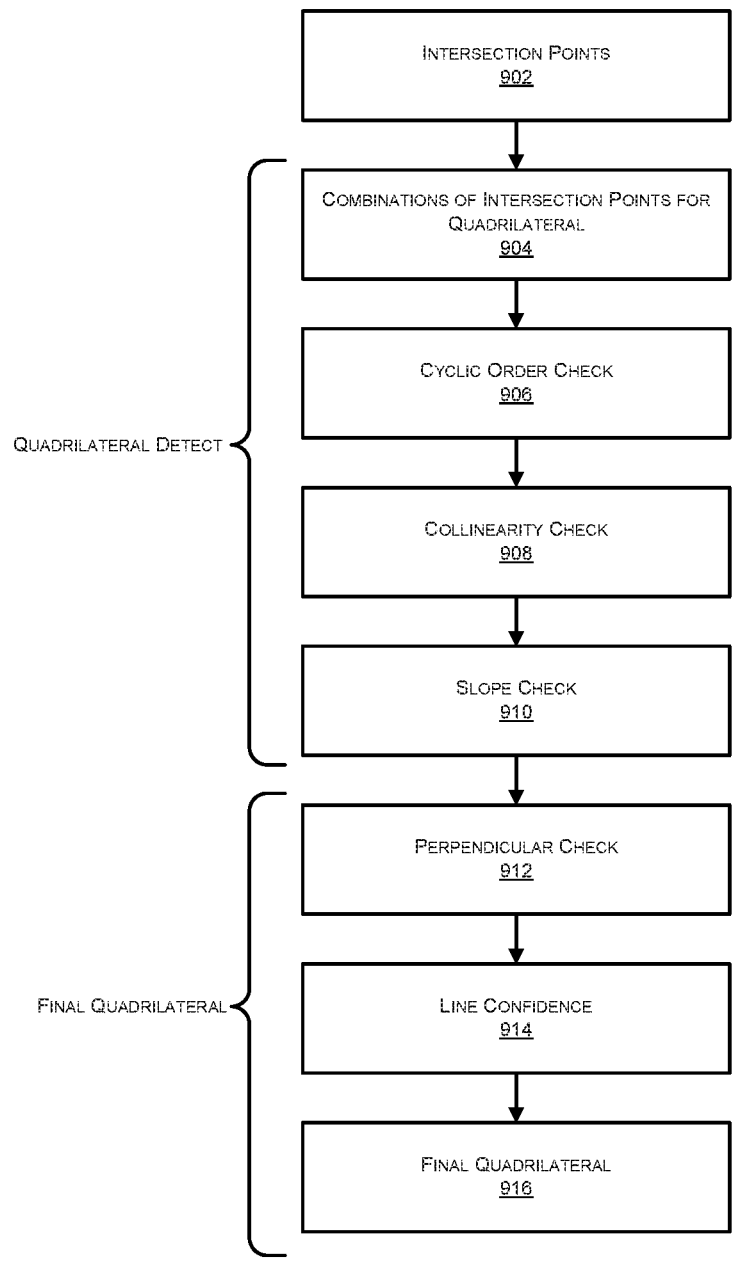
FIGS. 9 A-E illustrates determination of a quadrilateral pertaining to a parking slot according to an embodiment of the present disclosure.

As illustrated in FIG. 9A, for determination of the quadrilateral, a process for quadrilateral detection and a process for finalizing most optimal detection are performed.

At block 902, the intersection points and their corresponding lines are considered for quadrilateral detection. According to an embodiment, at block 904 combinations of intersection points in two different directions are found that have at that least one line common with the reference intersection point. For example, referring to FIG. 9C if intersection point A is a reference intersection point, combinations may be formed using points E, D and B. Both points E and D have Line 3 and Line 4 common with A and point B has Line 7 common with A. Thus, to complete the rectangle a fourth point is required to be determined for possible combinations (A, E, B) and (A, D, B). Taking first combination (A, E, B), point C has Line 6 common with E and Line 5 common with B, thus completing a quadrilateral (A, E, C, B). In the same way, there is another quadrilateral (A, D, C, B).

Thus, the possible quadrilaterals are detected. In an example, at block 906, corner points of each quadrilateral are sorted in clockwise order starting from a corner, say, top left corner. Further, at block 908 and 910 the corners may be subjected to co-linearity check to eliminate a quadrilateral if any three of its intersection points lie on a line and slope check to check that two opposite lines of the quadrilateral have similar slope.

In a preferred embodiment where the quadrilateral pertaining to the parking slot is a rectangle, during the process for finalizing most optimal detection, false detections are removed by performing a perpendicular check at block 912. At block 912, the perpendicular check is performed by determining the adjacent lines of the quadrilateral, which are at right angle or within some threshold range. Further at block 914, the lines of the detected quadrilateral are detected that lie close to the edges of the actual parking slot. At block 914, confidence of each lines of the quadrilateral is calculated based on how close it is to the edges of the slot. Finally, at block 916, quadrilaterals with all four lines of high confidence qualify are determined.

Figure 9B:
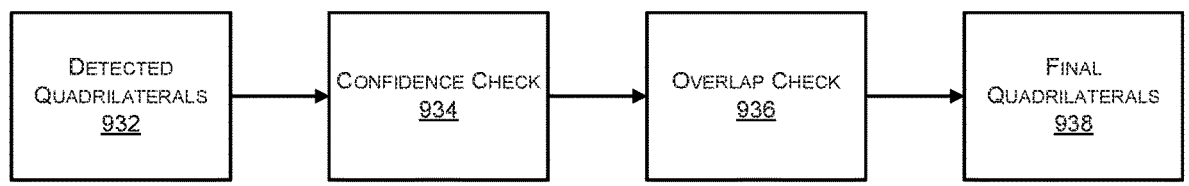
Figure 9C:
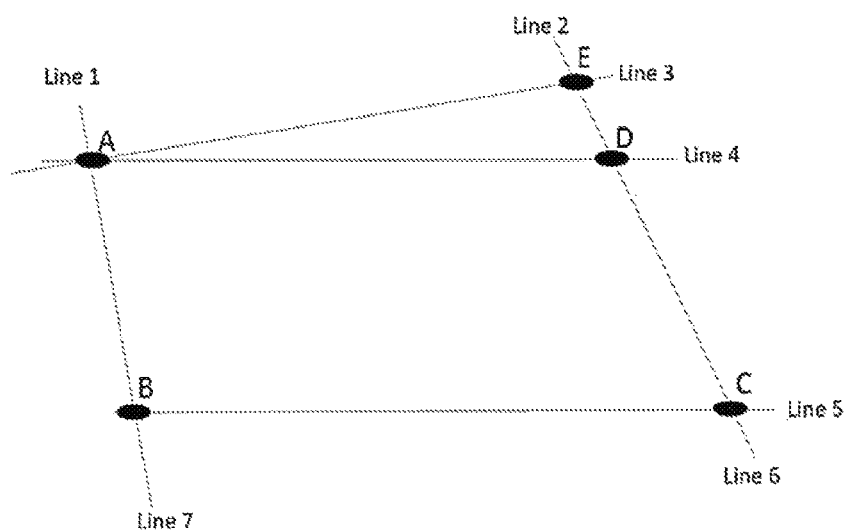

Further, with reference to FIG. 9B the detected quadrilaterals 932 are passed through two filtering techniques for filtering out false quadrilaterals that may not pertain to parking slots. First filtering technique i.e. confidence check 934 is based on the overall confidence of every quadrilateral detected in the image. The high confidence rectangles are processed for second filtering technique and low confidence rectangles are removed. According to an embodiment, a quadrilateral is marked with high confidence if all sides of said quadrilateral lie close to edges. The closer the sides is to the edges, higher is the confidence.

According to an embodiment, confidence check 934 utilizes three processes namely a quadrilateral line confidence determination process, a quadrilateral confidence determination process and a quadrilateral filtration process.

The quadrilateral line confidence determination process may be performed in similar manner as the line confidence determination explained with reference to FIGS. 7A and 7B. For example, the confidence is calculated by taking start and end points (x and y coordinates) of each line of quadrilateral. Further, based on slope, every line of the quadrilateral is characterized as a horizontal line or a vertical line to select a different window size for each of the characterized horizontal line and the vertical line.

For each line characterized as a horizontal line or a vertical line, intermediate points between start and end points are calculated along the line. These intermediate points are passed to calculate the confidence of each point. In an event when, the intermediate point is lying along the edge in the perspective view image or has max intensity value when compared to the side pixels within the window, the point may be considered as the confident point. The sum of confidence value of all the points divided by the count of intermediate points may be computed as the confidence value of a particular line. In an embodiment, the detection of line is marked with high confidence if line lies close to the edges in the perspective view image. Thus, closer the line to the edges, higher is the confidence.

Figure 9D:
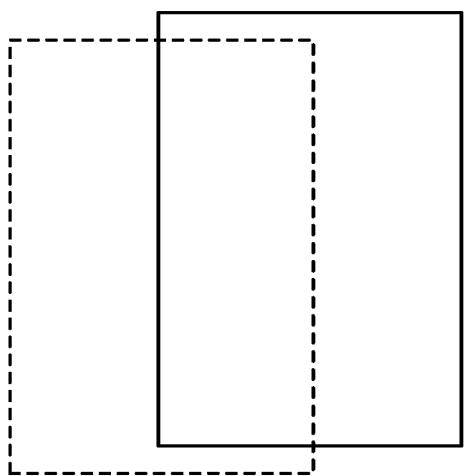
Figure 9E:
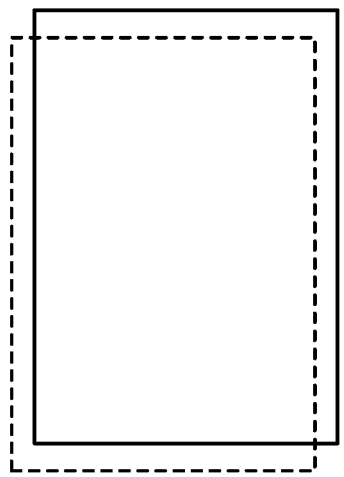

The quadrilateral confidence determination process is performed by calculating sum of confidence of all four lines of a quadrilateral and dividing the obtained sum by number of lines of the quadrilateral (i.e. 4). FIG. 9D illustrates a quadrilateral with low confidence and FIG. 9E illustrates a quadrilateral with high confidence.

Further, quadrilateral filtering process is based on the overall confidence of every detected quadrilateral. The high confidence quadrilaterals are processed and low confidence quadrilaterals are eliminated.

In second filtering technique i.e. overall check 936, the confident candidates are tested for overlapping. Overlapping quadrilaterals are filtered out based on the percentage overlap and area, which the overlapping quadrilaterals cover. For example, in case the overlap is above a pre-determined threshold the quadrilateral with smaller area may be retained and the one with larger area may be removed.

Figure 10:
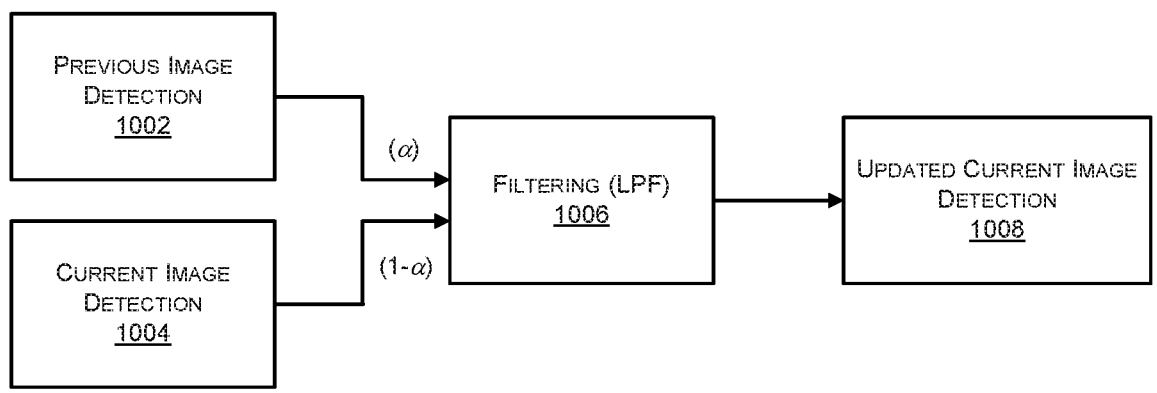
FIG. 10 illustrates a block diagram for implementation of a smoothening technique according to an embodiment of the present disclosure.

FIG. 10 illustrates a block diagram for implementation of a smoothening technique according to an embodiment of the present disclosure.

According to an embodiment, to perform quadrilateral filtering technique corners of all the detected quadrilateral in previous images of the sequence of images are stored and compared with corners of the quadrilaterals of same parking slot in current image of the sequence of image, using respective weightage factors i.e. ($\alpha$) for detection in previous images and ($1-\alpha$) for detection in current image. As illustrated a low pass filter 1006 is utilize for said comparison.

In case a quadrilateral pertaining to a new parking slot is detected in the current image 1004, the coordinate mapping is not performed unless there has been detection pertaining to the same parking slot in previous images 1002. Exemplary equations utilized for coordinate mapping may be given by:

$$x_t = (\alpha)*x_{t-1} + (1-\alpha)*x_t \qquad (1)$$

$$y_t = (\alpha)*y_{t-1} + (1-\alpha)*y_t \qquad (2)$$

The weightage factor ($\alpha$) decides whether current or previous coordinate values are more reliable. In an embodiment, the weightage factor is inversely proportional to speed of the vehicle, i.e. more the speed of the vehicle, less should be weightage factor to previous image otherwise a drag in detection of current image would occur. With optimal match of vehicle speed and weightage factor, the coordinates of detection in current image are fixed with respect to the previous image, thus giving a relatively stable output.

Figure 15:
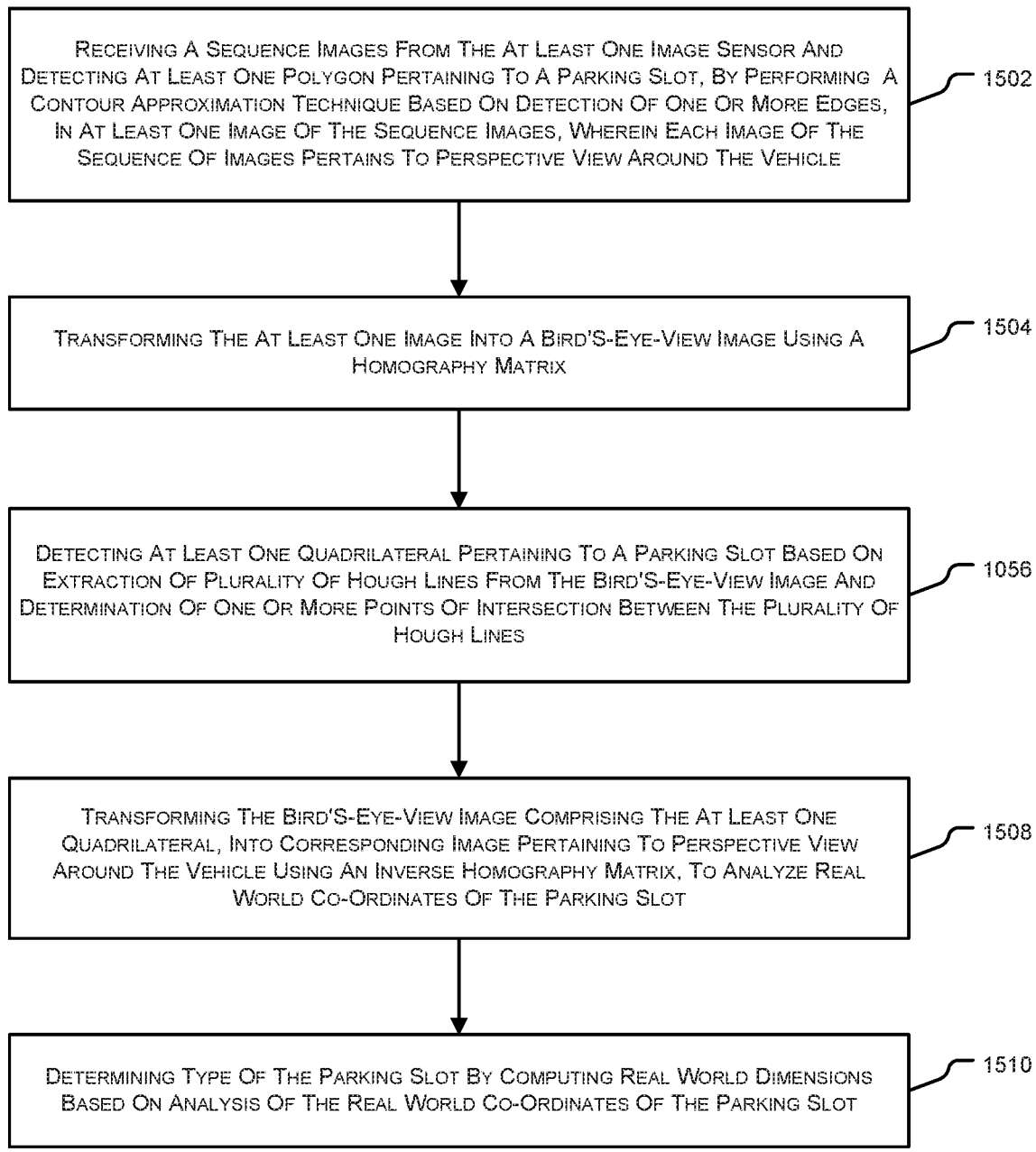
FIG. 15 illustrates a method of working of proposed system in accordance with an exemplary embodiment of the present disclosure.

FIG. 15 illustrates a method of working of proposed system in accordance with an exemplary embodiment of the present disclosure.

In an aspect, the proposed method may be described in general context of computer executable instructions. Generally, computer executable instructions can include routines, programs, objects, components, data structures, procedures, modules, functions, etc., that perform particular functions or implement particular abstract data types. The method can also be practiced in a distributed computing environment where functions are performed by remote processing devices that are linked through a communications network. In a distributed computing environment, computer executable instructions may be located in both local and remote computer storage media, including memory storage devices.

The order in which the method as described is not intended to be construed as a limitation, and any number of the described method blocks may be combined in any order to implement the method or alternate methods. Additionally, individual blocks may be deleted from the method without departing from the spirit and scope of the subject matter described herein. Furthermore, the method may be implemented in any suitable hardware, software, firmware, or combination thereof. However, for ease of explanation, in the embodiments described below, the method may be considered to be implemented in the above described system.

In an aspect, present disclosure elaborates upon a method for detecting free parking space for a vehicle that comprises, at step 1502, receiving a sequence of images from the at least one image sensor and detecting at least one polygon pertaining to a parking slot, by performing a contour approximation technique based on detection of one or more edges, in at least one image of the sequence of images, wherein each image of the sequence of images pertains to perspective view around the vehicle. The method further comprises a step 1504 that pertains to transforming the at least one image into a bird's-eye-view image using a homography matrix and step 1506 that pertains to detecting at least one quadrilateral pertaining to a parking slot based on extraction of plurality of Hough lines from the bird's-eye-view image and determination of one or more points of intersection between the plurality of Hough lines. Furthermore, the method comprises step 1508 of transforming the bird's-eye-view image comprising the at least one quadrilateral, into corresponding image pertaining to perspective view around the vehicle using an inverse homography matrix, to analyse real world co-ordinates of the parking slot and a step 1510 of determining type of the parking slot by computing real world dimensions based on analysis of the real world co-ordinates of the parking slot.

Thus, the proposed system aids in identifying available parking slots easily by saving time and energy. Image processing techniques are utilized to interpret video images and give the driver information about the type of the parking slot and whether it is free or occupied. Further, the images captured by a lateral camera placed on the external mirror position of the vehicle may be processed to detect free/occupied parking space on the road, thus providing the information regarding the vehicle position with respect to the parking space boundaries, type of parking slot and its status.

As elaborated above, the proposed system uses several unique features. For example, homography matrix is used for image transformation from perspective image to bird's eye view image and vice versa that provides a correct confirmation of quadrilateral pertaining to parking slot as perpendicularity check can be verified easily. Further, the present disclosure utilizes mapping of real world coordinates using perspective image. The real-world length and width of the parking slot are determined using the real-world coordinates. Also, based on the dimensions, type of parking and slot is determined and a dimension check is performed in real world coordinates for better accuracy. The output includes type and status of the slot, assisting driver to decide whether to park in the detected slot or not. It would be appreciated that, the proposed system is based on integration of basic geometric concepts with image processing that provides simple and real-time detection of parking slots. Also, the proposed system is capable of working in cluttered environment when the vehicle is surrounded with neighbouring vehicles in close proximity.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

The present disclosure provides a system and method for detection of free parking space for a vehicle.

The present disclosure provides a system and method for detection of free parking space for a vehicle that detects the free parking slot even if the lines pertaining to the parking slot are faded in obtained images due to light conditions.

The present disclosure provides a system and method for detection of free parking space that provides type and status of the parking slot to driver of the vehicle.

The present disclosure provides a system and method for detection of free parking space that enables detection in cluttered environment when the vehicle is surrounded by other neighbouring vehicles.

We claim:

1. A detection system implemented in a vehicle, said system comprising:
   an input unit comprising at least one image sensor for imaging a perspective view around a vehicle; and
   a processing unit operatively coupled to the input unit, the processing unit comprising a processor coupled with a memory, the memory storing instructions executable by the processor to:
      receive a sequence of images from the at least one image sensor;
      detect at least one polygon pertaining to a parking slot, by performing a contour approximation technique based on detection of one or more edges, in at least one image of the sequence of images;
      transform the at least one image comprising the at least one polygon into a bird's-eye-view image using a homography matrix;
      detect at least one quadrilateral pertaining to the parking slot based on extraction of a plurality of Hough lines from the bird's-eye-view image and determination of one or more points of intersection between the plurality of Hough lines;
      validate the extracted plurality of Hough lines by:
         transforming the bird's-eye-view image comprising the at least one quadrilateral, into corresponding image pertaining to perspective view around the vehicle using an inverse homography matrix, to analyze real world coordinates of the parking slot;
         determining a confidence value of each Hough line of the plurality of Hough lines, wherein the confidence value is high if position of said Hough line is in proximity of corresponding edge selected from the detected one or more edges in the at least one image; and
         removing at least one Hough line of the plurality of Hough lines, the at least one Hough line having the confidence value lower than a first pre-determined threshold; and
      determine a type of the parking slot by computing real world dimensions based on analysis of the real world coordinates of the parking slot.

2. The detection system of claim 1, wherein the memory further stores instructions executable by the processor to:
   analyze a status of the parking slot based on spatial information of the detected at least one quadrilateral in the bird's-eye view image.

3. The detection system of claim 1, wherein the type of the parking slot is one of a parallel parking slot, a perpendicular parking slot or an angular parking slot.

4. The detection system of claim 2, further comprising an output unit operatively coupled to the processing unit and configured to provide any or a combination of the status and the type of the parking slot to a driver of the vehicle.

5. The detection system of claim 1, wherein the memory further stores instructions executable by the processor to:
filter detected parking slots having inaccurate dimensions by comparing the computed real world dimensions with actual real world dimensions of the parking slot.

6. The detection system of claim 1, wherein, following extraction of the plurality of Hough lines, the processor further categorizes each of one or more Hough lines selected from the plurality of Hough lines into a vertical line and a horizontal line based on a slope value for each of the one or more Hough lines.

7. The detection system of claim 6, wherein the memory further stores instructions executable by the processor to:
extract one or more dominant vertical lines based on a first median slope value computed using the slope values of the one or more Hough lines categorized as vertical lines and one or more dominant horizontal lines based on a second median slope value computed using the slope values of the one or more Hough lines categorized as horizontal lines.

8. The detection system of claim 1, wherein in order to determine the one or more points of intersection, the processor computes a start point and an end point of each of the plurality of Hough lines and extends each of the plurality of Hough lines beyond the corresponding start point and the corresponding end point.

9. The detection system of claim 1, wherein:
on detection of the at least one quadrilateral, the processor performs any or a combination of a first filtering technique and a second filtering technique on the detected at least one quadrilateral,
the first filtering technique being based on determination of a confidence value of each of the detected at least one quadrilateral and the second filtering technique being based on determination of at least overlapping quadrilaterals such that in case an overlap value is above a second pre-determined threshold, a quadrilateral having larger area among the at least two overlapping quadrilaterals is removed.

10. The detection system of claim 1, wherein the memory further stores instructions executable by the processor to:
perform a smoothing technique by comparing corners of the at least one quadrilateral detected in at least any two consecutive images of the sequence of images.

11. The detection system of claim 1, wherein said detection system is configured to perform a detection when the vehicle is surrounded by a plurality of neighbouring vehicles in close proximity.

12. A method, carried out according to instructions stored in a computer implemented in a vehicle, comprising:
receiving a sequence of images from at least one image sensor pertaining to a perspective view around the vehicle;
detecting at least one polygon pertaining to a parking slot, by performing a contour approximation technique based on detection of one or more edges, in at least one image of the sequence of images;
transforming the at least one image comprising the at least one polygon into a bird's-eye-view image using a homography matrix;
detecting at least one quadrilateral pertaining to the parking slot based on extraction of a plurality of Hough lines from the bird's-eye-view image and determination of one or more points of intersection between the plurality of Hough lines;
validating the extracted plurality of Hough lines by:
transforming the bird's-eye-view image comprising the at least one quadrilateral, into corresponding image pertaining to perspective view around the vehicle using an inverse homography matrix, to analyze real world coordinates of the parking slot;
determining a confidence value of each Hough line of the plurality of Hough lines, wherein the confidence value is high if position of said Hough line is in proximity of corresponding edge selected from the detected one or more edges in the at least one image; and
removing at least one Hough line of the plurality of Hough lines, the at least one Hough line having the confidence value lower than a first pre-determined threshold; and
determining a type of the parking slot by computing real world dimensions based on analysis of the real world coordinates of the parking slot.

\* \* \* \* \*